(12) United States Patent
Ramos et al.

(10) Patent No.: US 7,900,699 B2
(45) Date of Patent: Mar. 8, 2011

(54) METHOD AND APPARATUS FOR LOGGING A WELL USING A FIBER OPTIC LINE AND SENSORS

(75) Inventors: Rogerio Ramos, Chandlers Ford (GB); Nigel Leggett, Salisbury (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 1210 days.

(21) Appl. No.: 10/525,562

(22) PCT Filed: Aug. 29, 2003

(86) PCT No.: PCT/GB03/03785
§ 371 (c)(1),
(2), (4) Date: Oct. 3, 2005

(87) PCT Pub. No.: WO2004/020789
PCT Pub. Date: Mar. 11, 2004

(65) Prior Publication Data
US 2006/0157239 A1    Jul. 20, 2006

Related U.S. Application Data

(60) Provisional application No. 60/434,093, filed on Dec. 17, 2002, provisional application No. 60/407,084, filed on Aug. 30, 2002.

(51) Int. Cl.
*E21B 47/12* (2006.01)
(52) U.S. Cl. .................................. 166/250.01; 166/66
(58) Field of Classification Search .............. 166/250.01, 166/66, 66.5
See application file for complete search history.

(56) References Cited

U.S. PATENT DOCUMENTS

| | | | |
|---|---|---|---|
| 6,693,660 B2 * | 2/2004 | Hemmings | 347/252 |
| 2001/0029863 A1 * | 10/2001 | Hemmings | 101/484 |
| 2005/0034857 A1 * | 2/2005 | Defretin et al. | 166/250.01 |
| 2005/0263281 A1 * | 12/2005 | Lovell et al. | 166/255.1 |

* cited by examiner

*Primary Examiner* — William P Neuder (57) ABSTRACT

A system and method to log a wellbore, comprising a logging tool adapted to be deployed in a wellbore environment, the logging tool including at least one sensor for taking a measurement of the wellbore environment. The sensor is a fiber optic sensor and the system includes a fiber optic line in optical communication with the sensor. The data measured by the sensor is transmitted through the fiber optic line on a real time basis to the surface, Where the data is processed into a real time display. In one embodiment, the fiber optic sensor is a passive sensor not requiring electrical or battery power. In another embodiment, a continuous tube with one end at the earth's surface and the other end in the wellbore is attached to the logging tool and includes the fiber optic line disposed therein.

15 Claims, 10 Drawing Sheets

METHOD AND APPARATUS FOR LOGGING A WELL USING A FIBER OPTIC LINE AND SENSORS

CROSS REFERENCE TO RELATED APPLICATIONS

This claims the benefit under 35 U.S.C. §119(e) of the following U.S. Provisional Applications: Ser. No. 60/434,093, entitled "Method and Apparatus for Logging a Well Using a Fiber Optic Line and Sensors," filed Dec. 17, 2002; and Ser. No. 60/407,084, entitled "Optical Fiber Conveyance, Telemetry, and Application," filed Aug. 30, 2002, all of which are hereby incorporated by reference.

BACKGROUND

This invention generally relates to the logging of subterranean wells. More particularly, the invention relates to the logging of such wells using a fiber optic line and fiber optic sensors.

Prior art logging systems have been deployed via electric wireline and via slickline. Wireline deployed logging systems are able to transmit the data collected by the logging tool real time through the electric line. Although wireline deployed logging systems are able to transmit data real time via the electrical wires, such systems require a grease injector in order to ensure that pressure from the wellbore does not escape around the wireline as it is inserted into a pressurized well during deployment and use. Grease injectors, however, are problematic instruments to use, since they require great care during maintenance and operation, have a tendency to leak under pressure and continual wear, and present an environmental hazard when such leaks occur. Moreover, wireline deployed logging systems are costly to deploy.

On the other hand, current slickline deployed lines are manufactured from solid wire and are not able to transmit the logging tool data real time to surface. Instead, slickline deployed logging systems use memory tools connected to the lower end of the line. In slickline memory logging, the slickline and battery-powered memory tools are lowered downhole on the end of the slickline and the memory tool is used to record the downhole logging tool data for subsequent download and collection at the surface once the tools are retrieved from the well. The advantages of slickline deployed systems are that they are much less costly and easier to deploy than wireline deployed systems, they can be run in the hole and out of the hole faster than braided wire, and they are easier to seal against well pressure at the well head.

Most of the logging tools deployed on wireline or slickline are electrically powered devices. Electrically powered devices include electronics that are very sensitive and that often become damaged in the hard environment of a subterranean wellbore. In addition, some logging tools are memory tools and/or include downhole batteries. It is often difficult to shield or protect these electrical components against the high temperatures and pressures commonly found in a wellbore, which high temperatures and pressures typically deteriorate and damage the electrical components of the tools.

Thus, there exists a continuing need for an arrangement and/or technique that addresses one or more of the problems that are stated above. In particular, the prior art would benefit from a logging system that has the capability of transmitting the logging tool data real time to surface, that is as economical and as easy to deploy as slickline deployed systems, and that does not include the detriments of electrically or battery powered devices.

SUMMARY

Some embodiments of the invention include a system and method to log a wellbore, comprising a logging tool adapted to be deployed in a wellbore environment, the logging tool including at least one sensor for taking a measurement of the wellbore environment. The sensor is a fiber optic sensor and the system includes a fiber optic line in optical communication with the sensor. The data measured by the sensor is transmitted through the fiber optic line on a real time basis to the surface, where the data can be processed into a real time display. The fiber optic sensor can be a passive sensor not requiring electrical or battery power. In one embodiment, a continuous tube with one end at the earth's surface and the other end in the wellbore is attached to the logging tool and includes the fiber optic line disposed therein. In other embodiments, the fiber optic line is embedded within a slickline, a braided optical cable, or an electro optical cable.

DETAILED DESCRIPTION

Figure 1:
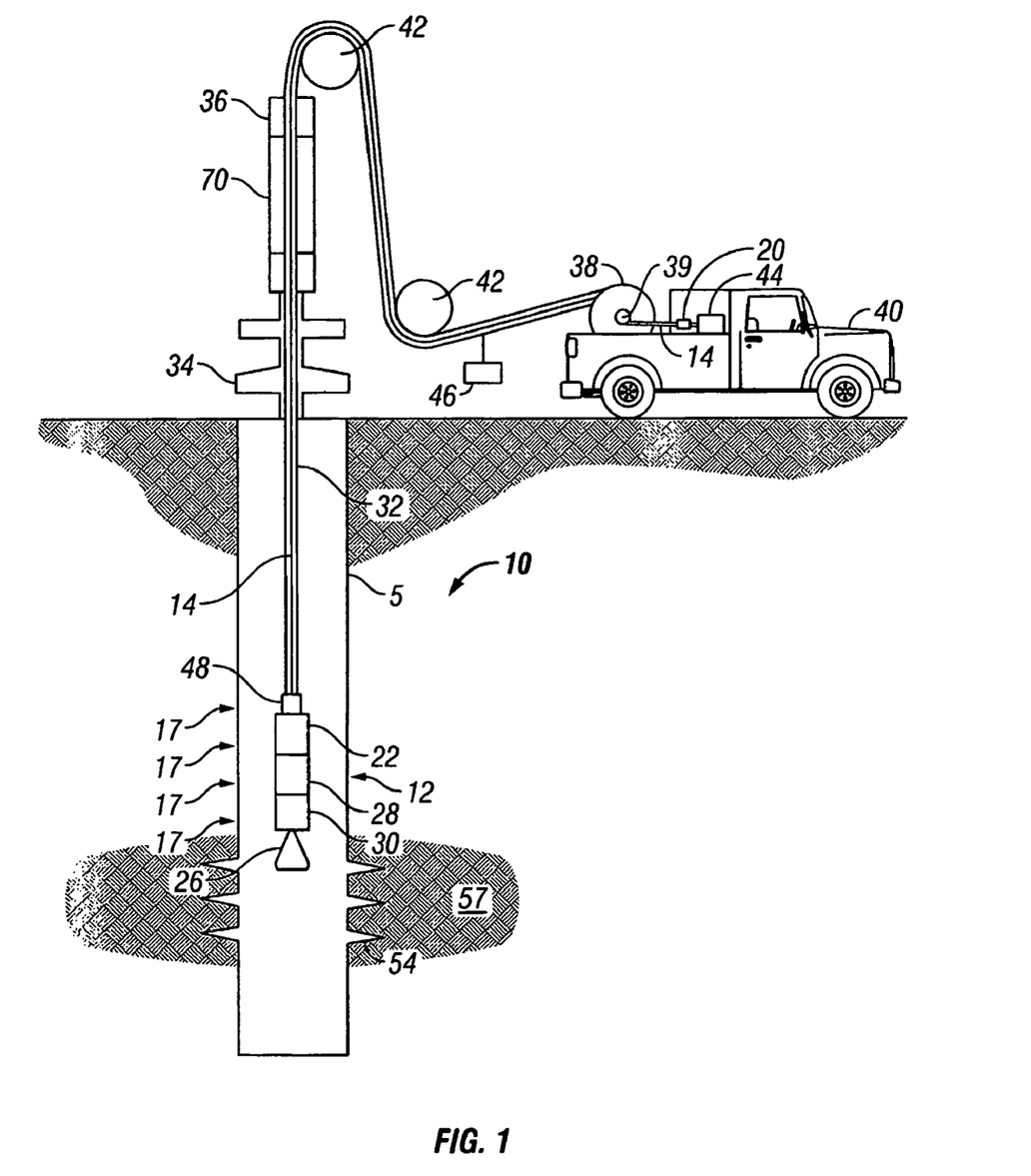
FIG. 1 is a schematic of one embodiment of the logging system of this invention.

FIG. 1 shows the logging system 10 according to an example embodiment of the present invention disposed in a wellbore 5. Wellbore 5 may be cased. The logging system 10 includes at least one logging tool 12, at least one fiber optic line 14, and at least one fiber optic sensor 17. Data collected by the sensor 17 is transmitted real time to the surface via the fiber optic line 14. Other data, such as tool status reports (i.e., active/not active, malfunctioning, status), may also be sent from the logging tool 12 through the fiber optic line 14 to the surface on a real time basis.

Sensor 17 may include but are not necessarily limited to a pressure sensor 22, a flow sensor such as spinner 26, a chemical properly sensor 28, or a casing collar locator 30. Each sensor 17 collects its data, and a signal representative of the data is transmitted via the optical fiber 14. Sensors 17 may also include other fiber optic data gathering tools or sensors, including optical fluid analyzers, gamma ray tools, temperatures sensors, chemical property sensors, gyro tools, water detection sensors, gas detection sensors, oil detection sensors, acoustic sensors, differential pressure sensors, spectrometers, inclinometers, relative bearing sensors, distributed temperature sensors, distributed strain sensors, distributed pressure sensors, hydrophones, accelerometers, sonic tools, resistivity sensors, or induction sensors, to name a few.

In this application, the term "logging tool" is a tool that measures at least one parameter of the wellbore, wellbore environment, wellbore fluids, or formation (collectively referred to as "wellbore environment"). Likewise, the term "logging" is the taking of measurements of at least one parameter of the wellbore environment. Logging can occur while the tools are held stationary at a given depth or while the tools are moved up and down in the wellbore while simultaneously gathering data and transmitting the data to the surface through at least one optical fiber. It is understood that the term "logging tool" may include a plurality of sensors, each of which may measure a different parameter. In addition, a plurality of logging tools 12, which with at least one or a plurality of sensors 17, may also be used with some embodiments of this invention.

Sending information on a "real-time basis" or "in real time" refers to sending the information as measurements or other events are occurring. However, "real time" does not require that the information be sent immediately after collection—some delay (due to processing, storage, or other tasks) can occur between collection and transmission). Sending information in real time is distinguished from collecting information with a downhole tool in a well, storing the information in the downhole tool, retrieving the downhole tool to the well surface, and offloading the stored information from the tool to surface equipment.

Figure 2:
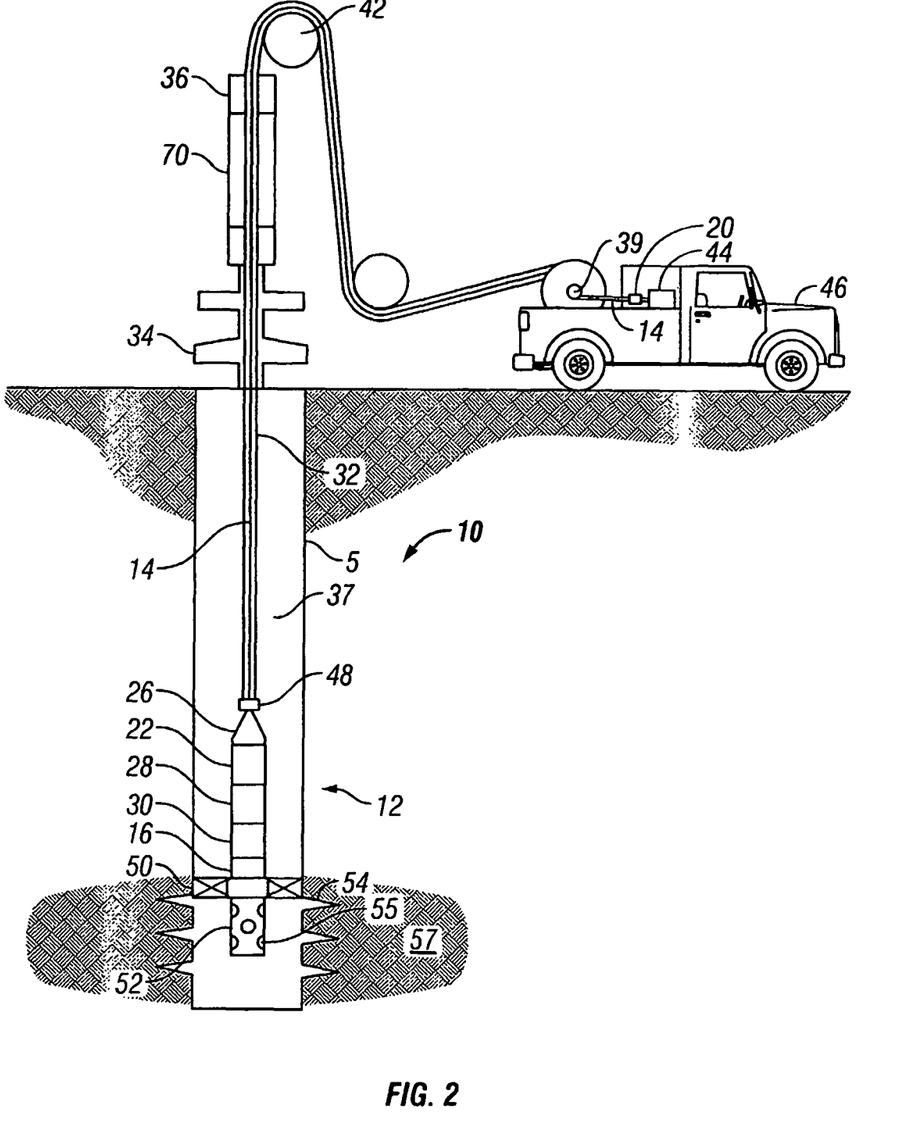
FIG. 2 is a schematic of another embodiment of the logging system of this invention.

In one embodiment, the fiber optic line 14 is disposed within a conduit 32, which may protect the fiber optic line 14 from the harsh wellbore fluids and environment. Conduit 32 also protects fiber optic line 14 from strain that may otherwise be induced during the deployment, logging and recovery operations of the tools and optic fiber tube. Logging tool 12, as well as sensors 17, may be attached to the conduit 32; therefore, the fiber optic lie 14 located within the conduit 32 does not bear the full weight of the logging tool 12. In one embodiment, conduit 32 is a small diameter tube, such as 3/16 inches, that has a wall thickness large enough to support the logging tool 12 in addition to the weight of the tube and optic fibers disposed therein. In another embodiment, conduit 32 is a coiled tubing string 37 (as shown in FIG. 2), with the fiber optic line(s) 14 disposed therein. In another embodiment (not shown), small diameter conduit 32 may be deployed within a coiled tubing string.

In one embodiment, conduit 32 may be deployed on a reel such that the tube, optical fibers, and tools can be recovered a plurality of times from wells. The tools can subsequently be disconnected at surface, and the reel with the tube and optic fibers can thus be transported to other wells where tools can be reconnected to the tube and then re-deployed in a different well. In one embodiment, conduit 32 is a continuous tube that extends from the surface to the downhole logging tool(s) 12.

Wellhead 34 is located at the top of wellbore 5. Conduit 32 with fiber optic line 14 therein is passed through a stuffing box 36 or a packing assembly located on wellhead 34 as well as a lubricator 70. Stuffing box 36 provides a seal against conduit 32 so as to safely allow the deployment of logging system 12 even if wellbore 5 is pressurized.

Conduit 32 may be deployed from a reel 38 that may be located on a vehicle 40. Several pulleys 42 may be used to guide the conduit 32 from the reel 38 into the wellbore 5 though the stuffing box 36, lubricator 70, and wellhead 34. Based on the size of the conduit 32, deployment does not require a coiled tubing unit (if conduit 32 is not a coiled tubing or is not deployed within a coiled tubing) nor a large winch truck. Reel 38, in one example implementation, has a diameter of approximately 22 inches. Being able to use a smaller reel and vehicle than conventional coiled tubing reels and vehicles with electrical and braided wire deployment logging systems dramatically reduces the costs of the operation. In the embodiment using a coiled tubing string, reel 38 has a diameter appropriate to accommodate such coiled tubing and the deployment and recovery equipment is the same as that use with coiled tubing deployment and recovery.

Fiber optic line 14 is connected to an acquisition unit 44 that is normally located at the surface and may be located in the vehicle 40. Acquisition unit 44 receives the optical signals sent from the logging tool 12 through the fiber optic line 14. Acquisition unit 44, which would typically include a microprocessor and an opto-electronic unit, delivers the data (the optical signals) to a processor, which processes the data and enables the presentation of the data to a user at surface. Delivery to the user can be in the form of graphical display on a computer screen or a print out or the raw data transmitted from the logging tool 12. In another embodiment, acquisition unit 44 is a computer unit, such as a laptop computer, that plugs into the fiber optic line 14. In another embodiment, the data is transmitted at surface to a network, such as the Internet, and presented to users via a portion on the network. The surface acquisition unit 44 processes the optical signals or data from the downhole logging tools and optical fiber to provide the chosen data output to the operator. The processing can include data filtering and analysis to facilitate viewing of the data.

An optical slip ring (rotary connection) 39 is functionally attached to the reel 38 and enables the connection and dynamic optical communication between the fiber optic line 14 and the acquisition unit 44 while the reel is turning and running the tube into the well or pulling the tube out of the well. The optical slip ring 39 interfaces between the fiber optic line 14 that is turning with the reel and the stationary optic fiber at the surface. The slip ring 39 thus facilitates the transmission of the real tie optical data between the dynamically moving optic fiber inside the moving reel 38 and the stationary acquisition unit 44 at surface. In short, the slip ring 39 allows for the communication of optical data between a stationary optical fiber and a rotating optical fiber.

In one embodiment, a plurality of fiber optic lines 14 are disposed in conduit 32. The use of more than one fiber line 14 provides redundancy to the real time transmission of the data from the logging tool 12 to the surface, ability to use multiple logging tools, as well as increased optical power transmission to down hole tools and other device such as power sources. The use of more than one fiber optic line 14 also allows for both single and multimode optical fiber to be run.

Figure 6:
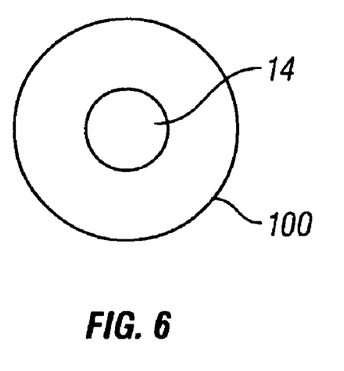
FIG. 6 is a schematic of a cross-section of a slickline including an optical fiber.

In another embodiment as shown in FIG. 6, instead of being deployed within a conduit 32, the optical fiber 14 is embedded within a slickline 100. Slickline 100 protects optical fiber 14 from the harsh wellbore fluids and environment. Logging tool 12, as well as sensors 17, are attached to the slickline 100; therefore, the optical fiber 14 does not bear the full weight of the logging tool 12. The deployment equipment including wellhead equipment required for use with slickline 100 is the same as for prior art slickline operations, including reels, lubricators, etc.

Figure 7:
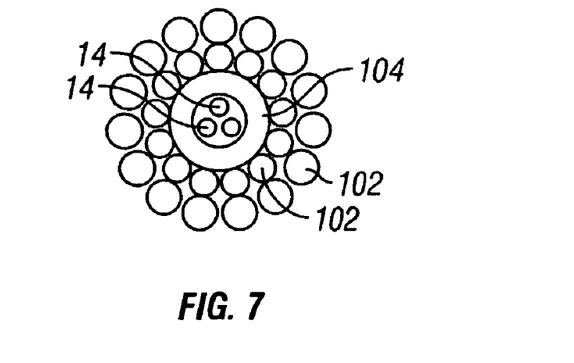
FIG. 7 is a schematic of a cross-section of a braided optical table.

In another embodiment as shown in FIG. 7, the optical fiber 14 is embedded within a braided cable typically composed of at least one (and typically more than one) layer of braids 102, such as steel braids and a filler material 104 within the braid layers 102. The filler material 104 protects at least one and sometimes a plurality of optical fibers 14 located therein. Braid layers 102 and filler material 104 protect optical fiber 14 from the harsh wellbore fluids and environment. Logging tool 12, as well as sensors 17, are attached to the braid layers 102; therefore, the optical fiber 14 does not bear the full weight of the logging tool 12.

Figure 8:
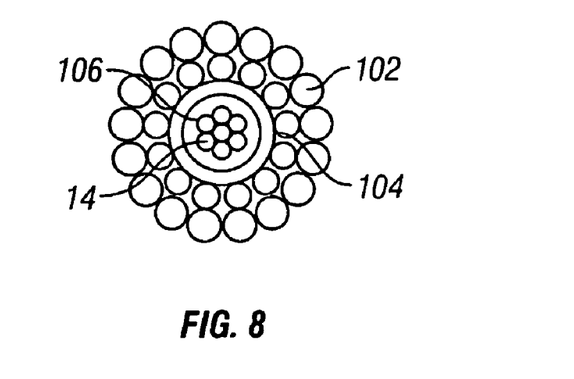
FIG. 8 is a schematic of a cross-section of an electro optical cable.

In another embodiment as shown in FIG. 8, the optical fiber 14 is embedded within an electro-optical cable, which is similar to the braided cable of FIG. 7. However, in this embodiment, at least on electrical conductor 106 is included with the optical fibers 14. The conductors 106 carry electricity to and from any electrically powered downhole tools that may be part of the logging tool 12. In one embodiment, the conductors 106 can also be used for purposes of telemetry and/or communication.

In one embodiment as shown in FIG. 1, each of the sensors 17 is a passive fiber optic sensor. In this embodiment, an optical transmitter 20 is located at the surface (in vehicle 40, for instance) and a modulator 48 may be located downhole. The surface optical transmitter 20 sends an optical signal, which may be in the form of pulses, down the fiber optic line 14 to the sensors 17. In the embodiment including the modulator 48, the modulator 48 modulates the optical signal sent from the surface optical transmitter 20 in a way that transmits the relevant data from the sensor 17. Typically, the modulator 48 changes a property of the optical signal, such as intensity, frequency, polarization state, coherence, or phase. In other words, the modulated signal effected by the modulator 48 becomes the optical signal with the data. Acquisition unit 44 (at the well surface) receives the modulated signal and converts it back into the sensor 17 data. In one embodiment, each sensor 17 has its own modulator 48. In another embodiment, one modulator 48 is associated with all of the sensors 17. In another embodiment not including a modulator 48, the sensor 17 reflects a return optical signal back to the acquisition unit 44 with the relevant measurement encoded therein. The relevant measurement is encoded in the return optical signal based on the interaction of the sensor 17 with the wellbore parameter being sensed. The data is typically encoded as a change in intensity, frequency, polarization state, coherence, or phase.

In another embodiment (not shown), an optical transmitter may be located downhole. In this embodiment, the downhole optical transmitter sends the optical signals through the fiber optic line 14 and to the acquisition unit 44 depending on the measurements take by the tools. In this embodiment, the downhole optical transmitter may be linked to a downhole battery for power.

In one embodiment, modulator 48 may be a reflector, such as a mirror or fiber grating.

Figure 3:
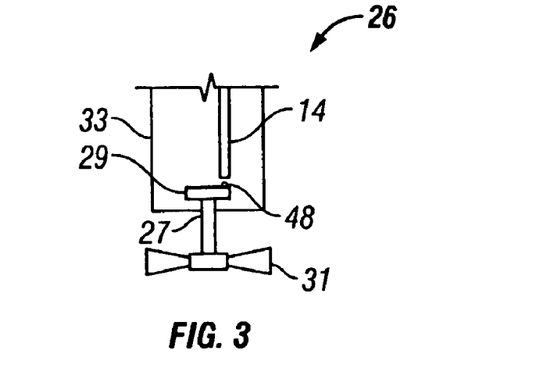
FIG. 3 is a schematic of one embodiment of a fiber optic flow sensor including a spinner.

Sensor 17 may include a spinner 26, as shown in FIG. 3. In this embodiment, modulator 48 may be part of the spinner 26. The blades 31 of the spinner 26 are located external to main housing 33 of the spinner 26, with the stem 27 connected to the blades 31 rotatably mounted with respect to the spinner housing 33. A disc 29 is also attached to the stem 27 inside the spinner housing 33, which disc 29 rotates along with stem 27 and spinner 26. The modulator 48 is positioned on the disc 29 so that it passes along the path of the surface-sent optical signal in the fiber optic line 14 once every revolution of the disc 29/blades 31. Thus, modulator 48 modulates the optical signal, for example, once every revolution of the disc 29/blades 31. Acquisition unit 44 receives the modulated signal (in this case a reflected pulse) and based on the frequency of reception is able to calculate the revolutions per minute of the blades 31. With this calculation, acquisition unit 44 is then able to calculate the flow of the fluids or other condition in the wellbore 12 that causes the spinner 26 to rotate. Thus, the spinner 26 serves as a passive fiber optic flow sensor.

Figure 14:
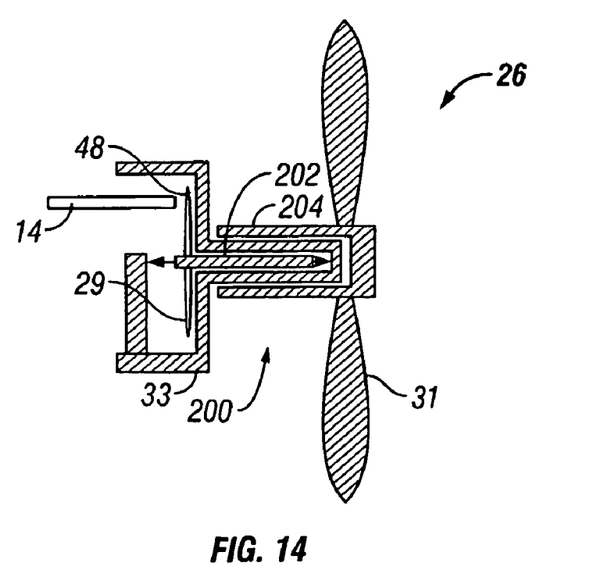
FIG. 14 is a schematic of another embodiment of a spinner.

FIG. 14 shows another embodiment of a spinner 26 that is similar to that shown in FIG. 3. The difference is that in the embodiment of FIG. 14 the disc 29 is sealed within the housing 33 and the blades 31 are sealed outside the housing 33 in order to prevent wellbore fluids from entering the housing 33 and contaminating or deteriorating the optical fiber 14 and optical fiber reading components. Essentially, stem 27 of the FIG. 3 embodiment is replaced with a magnetic coupling 200 between a magnetic disc component 202 and a magnetic blade component 204. The magnetic components 202, 204, each of which may include a permanent magnet, are constructed and configured so that rotation of the magnetic blade component 204 induces rotation of the magnetic disc component 202. In one embodiment, the magnetic blade component 204 has a cup shape, the magnetic disc component has a rod shape, and the housing 33 extends there between and thus also has a cup-shape in such interval. The modulator 48 and acquisition unit 44 function in similar fashion as the FIG. 3 embodiment.

In another embodiment, the modulator 48 on the disc 29 is omitted. Instead, a mirror is placed behind the disc 29 such that the disc 29 is interposed between the optical fiber 14 and the mirror. The disc 29 has one or more openings such that as the disc 29 rotates, an opening is intermittently aligned with the optical fiber 14 and the mirror to allow light from the optical fiber 14 to pass through the opening to the mirror and reflected light to pass through the opening from the mirror back to the optical fiber. This effectively provides a shutter effect, where the mirror is intermittently exposed to light from the optical fiber 14. The rotational speed of the disc 29 determines the frequency at which light is reflected from the mirror back to the optical fiber.

Figure 9:
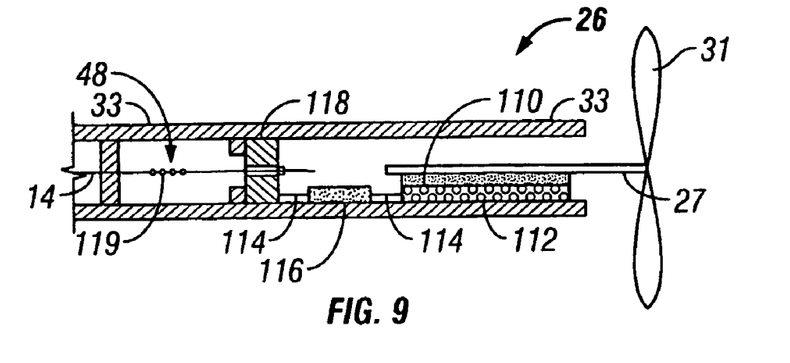
FIG. 9 is a schematic of another embodiment of a fiber optic flow sensor.

FIG. 9 shows another embodiment of a spinner 26. In this embodiment, a permanent magnet 110 is attached to the rotating stem 27. A fixed coil 112 is attached to the interior of the housing 33. The magnet 110 and coil 112 are placed and configured so that the two come into a magnetic coupling or connection, for example, once every revolution of blade 31/stem 27. Each time the magnet 110 and coil 112 become magnetically coupled, the electrical signal generated by such coupling or connection is sent through a conductor 114 to a voltage amplifier 116. The voltage amplifier 116 amplifies the voltage, which is then passed on to a piezoelectric material 118 that is mechanically coupled to the optical fiber 14. Voltage imparted to the piezoelectric material 118 causes the material 118 to constrict, creating a strain on optical fiber 14. Thus, the optical fiber 14 is placed under strain once for every revolution of blade 31. For this embodiment, at least one Fiber-Bragg Grating (FBG) 119 may be incorporated into the optical fiber 14.

The FBG 119 shifts the reflected wavelength of the optical signal being sent downhole each time strain is applied to optical fiber 14. The wavelength shift is then detected at the surface by the acquisition unit 44, which information can be used to determine the revolutions per unit time of the blades 31, thereby enabling the determination of the flow rate of the fluid propelling the blades 31. Instead of using piezoelectric material 118, a piezoelectric coating may be applied to optical fiber 14 in order to supply the required strain. In this embodiment, the FBG 119 can be part of the modulator 48. Alternatively, a fiber interferometer may be used instead of an FBG.

Figure 10:
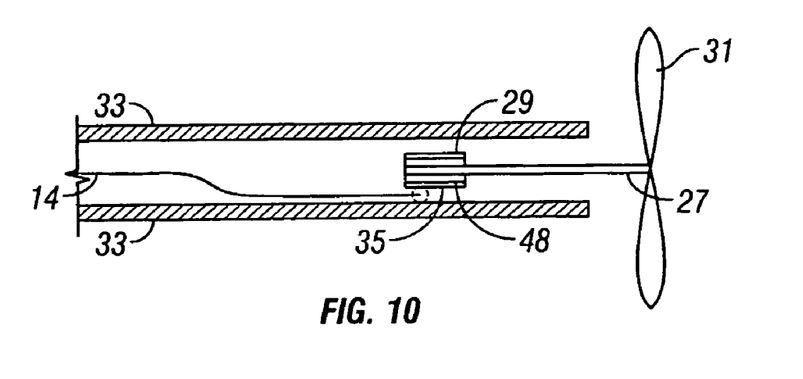
FIG. 10 is a schematic of another embodiment of a fiber optical flow sensor
Figure 11:
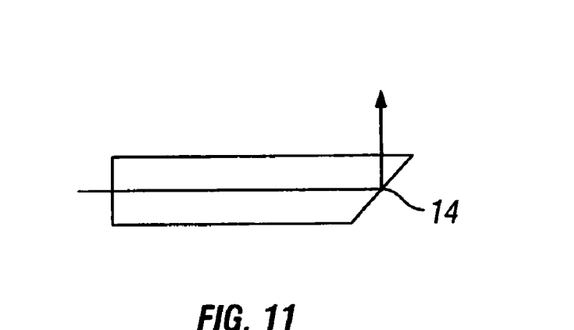
FIG. 11 is a schematic of an optical fiber used in conjunction with the flow sensor FIG. 10.

FIGS. 10 and 11 show another embodiment of a spinner 26. This embodiment is similar to that shown in FIG. 3. However, in this embodiment, modulator 48 is incorporated on the side 35 of disc 29. Optical fiber 14 is placed between the disc side 35 and the housing 33. In one embodiment, the optical fiber 14 is cut at a slanted angle (e.g., 45° angle) at its end (FIG. 11) in order to project optical signals in the direction of the disc side 35.

Figure 4:
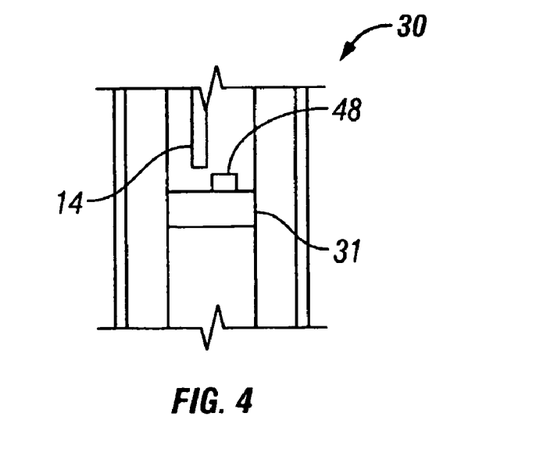
FIG. 4 is a schematic of a fiber optic casing collar locator when not activated.
Figure 5:
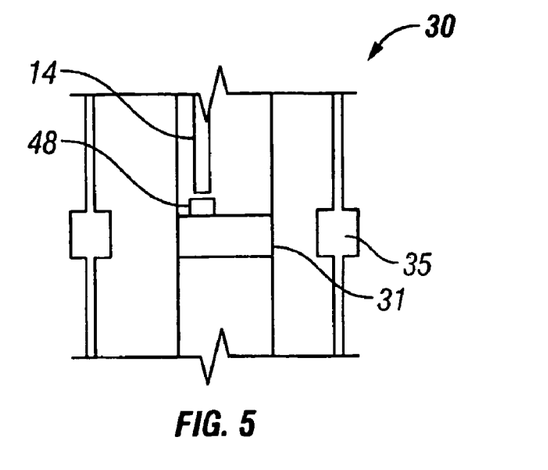
FIG. 5 is a schematic of a fiber optic casing collar locator when activated.

Sensor 17 may also include a casing collar locator 30, as shown in FIGS. 4 and 5. In this embodiment, casing collar locator 30 includes a magnetic component 31 that is activated each time it passes by a casing collar 33. FIG. 4 illustrates the casing collar locator 30 when the magnetic component 31 is not activated. As shown in FIG. 5, the locator 30 is arranged so that each time the magnetic component 31 is activated, the modulator 48 is activated or moved to modulate the optical signal sent down the fiber optic line 14. For instance, the modulator 48 may be activated to come in line with fiber optic line 14 and reflect back the optical signal each time the magnetic component 31 senses a casing collar 35. Thus, the acquisition unit 44 receives the modulated signal (a reflected pulse) each time the locator 30 passes a casing collar 33. The acquisition unit 44 then identifies the location of casing collars 33 passed by the logging tool 12.

Figure 12:
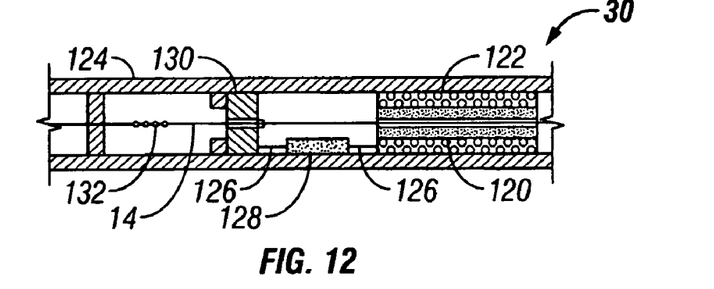
FIG. 12 is a schematic of another embodiment of a fiber optic casing collar locator.

FIG. 12 shows another embodiment of a casing collar locator 30. In this embodiment, a permanent magnet 120 and a coil 122 are fixedly mounted in the interior of housing 124. Optical fiber 14 may pass through the magnet 120 and coil 122, both of which can be annular in shape. As the casing collar locator 30 is deployed in a wellbore, it will pass a number of casing collars. Each time the locator 30 passes a casing collar, the casing collar and the magnet 120 and coil 122 will become magnetically coupled, which causes generation of an electric signal that is sent through a conductor 126 to a voltage amplifier 128. The voltage amplifier 128 amplifies the voltage, which is then passed on to a piezoelectric material 130 that is mechanically coupled to the optical fiber 14. Voltage imparted to the piezoelectric material 130 causes the material 130 to constrict creating a strain on optical fiber 14. Thus, the optical fiber 14 is placed under strain once for every casing collar that is sensed. For this embodiment, at least one Fiber-Bragg Grating (FBG) 132 may be incorporated into the optical fiber 14. The FBG 132 shifts the reflected wavelength of the optical signal being sent downhole each time strain is applied to optical fiber 14. The wavelength shift is then detected at the surface by the acquisition unit 44, which information can be used to identify the location of the sensed casing collars. Instead of using piezoelectric material 118, a piezoelectric coating may be applied to optical fiber 14 in order to supply the required strain. In this embodiment, the FBG 119 can be part of the modulator 48.

Figure 13:
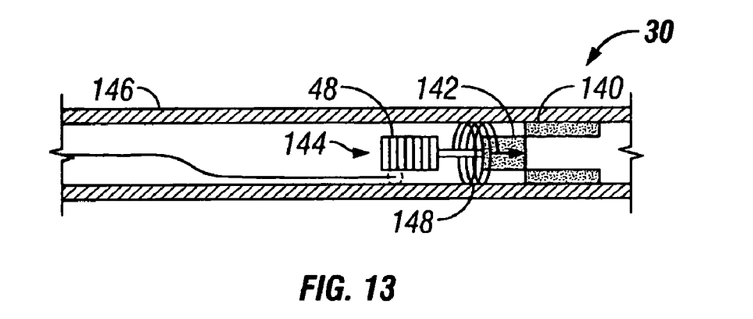
FIG. 13 is a schematic of another embodiment of a fiber optic casing collar locator.

FIG. 13 shows another embodiment of casing collar locator 30. This embodiment includes a permanent, fixed magnet 140 and a moving magnet 142. The fixed magnet 140 and moving magnet 142 are configured so that the moving magnet 142 moves in relation to the fixed magnet 140 each time the locator 30 passes a casing collar and a magnetic connection or coupling is created between the casing collar and the magnets 140, 142. The moving magnet 142 is fixed to a component 144 that includes a modulator 48. The modulator 48 may include alternately disposed black and white lines. Optical fiber 14 is disposed within housing 146 so that its end faces the side of component 144 and the modulator 48. The optical fiber 14 end is cut so that the optical signals are directed towards the modulator 48, as shown in FIG. 11. When moving magnet 142 moves, so does the modulator 48, which causes the black and white lines to also shift in relation to the optical fiber 14. The shift and movement in the black and white lines causes the reflected optical signal to also be modulated. Therefore, at the surface, an operator can identify the location of a casing collar each time the acquisition unit receives a reflected optical signal that is thus modulated. A spring 148 may be used to maintain moving magnet 142 and component 144 in a static position. Instead of black and white lines, the modulator 48 can include profiles of other color or shapes to provide indication of movement.

Alternatively, the modulator 48 of FIG. 13 can be a plate with one or more openings, with the plate being moveable by movement of the moving magnet 142. A mirror is aligned with respect to the end of the optical fiber, and the plate is provided between the mirror and the optical fiber. As the plate moves, an opening in the plate lines up with the mirror and the optical fiber end such that light can pass through the opening from the optical fiber to the mirror, and reflected light can pass from the mirror to the optical fiber through the opening. This effectively provides a light shutter effect controlled by movement of the moving magnet 142 where transmitted light (from the optical fiber) and reflected light (from the mirror) is allowed to intermittently pass through the opening of the moving plate.

Figure 15:
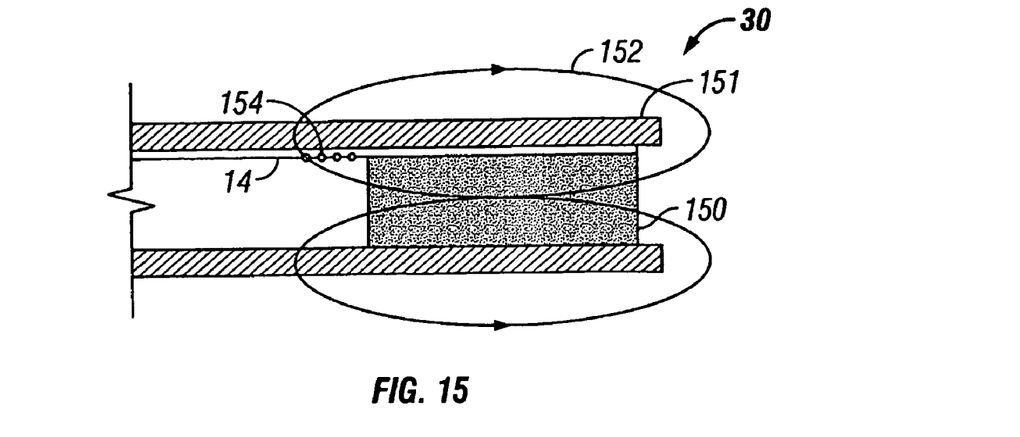
FIG. 15 is a schematic of another embodiment of a fiber optic casing collar locator.

FIG. 15 shows another embodiment of the casing caller locator 30, which includes a permanent magnet 150 that generates magnetic fields indicated as 152. The optical fiber 14 is coated with a magneto-strictive coating, which is formed of a magneto-strictive material (e.g., nickel). In the presence of a strong magnetic field, the magneto-strictive material shrinks slightly in the direction of the field. The shrinking of the magneto-strictive coating causes strain to be applied onto the optical fiber 14, which incorporates an FBG 154 to shift the reflected wavelength of an optical signal in response to strain applied to the optical fiber 14 by the magneto-strictive coating.

Various other types of fiber optic measurement, sensing, and transmission techniques may be used with the system, depending on the type of sensor 17. For instance, chemical sensors may include fiber optic lines doped or coated with a particular reactant that reacts only when it comes into contact with a target fluid or chemical (such as sulfur, water, or hydrogen sulfide). The reaction of the reactant then causes a specific change on the fiber optic line 14 which in turn causes a specific change ion the optical signal being returned by the sensor 17 from the downhole environment to the surface through the fiber optic line 14 (such as a change in intensity, frequency, polarization state, or phase). Acquisition unit 44 receives this return optical signal and discerns the relevant information from the sensor 17 by identifying the specific change imparted by the sensor 17 on the return optical signal. Fiber optic pressure sensors function in similar ways.

The fiber optic line 14 also allows a distributed temperature measurement to be taken along the length of the fiber optic line 14 or the plurality of optic fiber lines disposed inside the conduit 32 (FIG. 1). Generally, pulses of light at a fixed wavelength are transmitted from the optical transmitter 20 through the fiber optic line 14. Light is back-scattered within fiber optic line 14 and returns to the surface equipment 44. Knowing the speed of light and the moment of arrival of the return signal enables its point of origin along the fiber line 14 to be determined. Temperature stimulates the energy levels of the silica molecules in the fiber line 14. The back-scattered light contains upshifted and downshifted wavebands (such as the Stokes Raman and Anti-Stokes Raman portions of the back-scattered spectrum), which can be analyzed to determine the temperature at origin. In this way the temperature of each of the responding measurement points in the fiber line 14 can be calculated by the equipment 44, providing a complete temperature profile along the length of the fiber line 14. The fiber optic line 14 is connected to a distributed temperature measurement system receiver, which can be a unit within the acquisition unit 44 and which can be an optical time domain reflectrometry unit. The fiber optic line 14 can be used concurrently as a transmitter of data from the logging tool 12, a transmitter of downhole tool activation signals (as will be described), and as a sensor/transmitter of distributed temperature measurement. In another embodiment, fiber optic line 14 may be used to take a distributed strain measurement along the length of the fiber optic line(s) 14. The fiber optic line(s) 14 may also be used to support other sensing techniques, such as distributed or multipoint strain and/or temperature, or even an acoustic array.

It is noted that if more than one sensor 17 is used in the logging tool 12, the fiber optic line 14 may have to be split into a plurality of fiber optic lines, each being connected to a different sensor 17. Either wavelength division multiplexing (WDM) or time division multiplexing (TDM) may be used to interrogate the sensors 17 in this configuration. Optical couplers may also be used to facilitate this configuration. In another embodiment, a separate fiber optic line 14 is used for each sensor 17, with each fiber optic line 14 being disposed in the conduit 32.

In one embodiment, conduit 32, with fiber optic line 14 therein, may also be used to actuate downhole devices. Conduit 32 may be pressurized with a fluid, wherein the pressurized fluid actuates downhole tools such as a packer 50 or a perforating gun 52 (see FIG. 2). The activation signal may be applied pressure sent through conduit 32 above a certain threshold or pressure pulses with a specific signature. The downhole tool includes a signal receptor, such as a ratchet mechanism, shear pinned firing head, or a pressure transducer, which receives the activation signal and activates the downhole tool if the correct signal is received by the receptor. For instance, packer 50 may actuate to grip and seal against the wellbore walls, or thereafter, to ungrip and unseal from the wellbore walls. Also, perforating gun 52 may actuate to shoot the shaped charges 55 and create perforations 54 in the wellbore. Other downhole tools that may be activated include flow control valves, including sleeve valves and ball valves, samplers, sensors, pumps, or tractors.

In another embodiment, the downhole tools described above may be activated by optical signals sent through the fiber optic line 14 (instead of pressure signals sent through the conduit 32). In this embodiment, the downhole tool is functionally connected to the fiber optic line 14 so that a specific optical signal frequency, signal, wavelength or intensity activates the downhole tool. A photovoltaic converter can be used to facilitate the reception of the optical signal and conversion of the optical signal into activation energy for downhole tools. Such photovoltaic converters can convert optical energy into electrical or even mechanical energy. In another related embodiment, the downhole tool is connected to a fiber optic line 14 that is not used for logging data transmission to the surface.

In another embodiment, pressure pulses through the conduit 32 and optical signals through a fiber optic line 14 can both be sent to activate the downhole tools. In one embodiment, pressure pulses through the conduit 32 and optical signals through a fiber optic line 14 can be sent simultaneously to activate different downhole tools. In another embodiment, data in the form of optical signals can be transmitted through the fiber optic line 14 at the same time pressure signals are transmitted through the conduit 32. In yet another embodiment, data in the form of optical signals and activation commands in the form of optical signals can be sent simultaneously through the fiber optic line 14.

The attached figures show the use of logging system 10 is a land well. However, logging system 10 can also be used in offshore wells on platforms or located subsea.

In operation and in relation to FIGS. 1 and 2, an operator first connects stuffing box 36 and lubricator 70 on top of wellhead 34 and begins to deploy conduit 32 from the reel 38 and into wellbore 5. As previously stated, the stuffing box 36 seals against the outside wall of the conduit 32 enabling the deployment of the logging system 10 in a wellbore 5 that is pressurized. In general, the logging tool 12 is lowered to the appropriate depth in the well and the sensors 17 take their relevant readings as the tools are moved in the well. In another embodiment the tools are held stationary and data is gathered whilst the tubing, tools, and optic fiber are stationary in the well. In the embodiment in which the fiber optic line 14 is deployed after the conduit 32 is in place, the pump 46 is activated and the pumped fluid acts to drag the fiber optic line 14 down the conduit 32.

The surface optical transmitter 20 sends an unmodulated signal to the logging tool 12. In the embodiment including a modulator 48, the modulator 48 modulates the signal so as to encode the data onto the signal that returns to the acquisition unit 44. In the embodiment not including a modulator 48, the sensor 17 reflects a return optical signal back to the acquisition unit 44 with the relevant measurement encoded therein. In either case, the data measured by the logging tool 12 is sent to the acquisition unit 44 in real time.

Logging tool 12 may be lowered so that spinner 26 and the other sensors 17 are adjacent perforations 54 and formation 57 so as to obtain accurate and real time data of the parameters adjacent to such perforations 54 and formation 57. In the embodiment in which the fiber optic line 14 is also used as a distributed temperature measurement system, the distributed temperature measurements may be used to approximately determine flow along the length of the wellbore 5 (including across different perforations), since flow acts to change the temperature along the wellbore and hence the fiber optic line 14. Furthermore, this inferred distributed flow profile along the well can subsequently be correlated with the spinner logging tool located on the lower end of the conduit 32. Using the distributed temperature measurement to approximately determine flow indicates to an operator which areas or perforations in the wellbore 5 should be correlated with the logging tool 12, such as by taking the real flow measurement using spinner 26. Casing collar locator 30 may be used to identify the location of casing collars and therefore determine the depth of the logging tool 12.

The downhole tools, such as packer 50 and perforating gun 52, may be activated at any point by way of pressure signals or hydraulically transmitted energy through the conduit 32 or optical signals through a fiber optic line 14. Having the ability to perforate a formation and then log the relevant formation in the same trip saves time and money.

Once the logging operation is completed, the logging tool 12 is raised by reversing reel 38. It is appreciated that reel 38 and the relative size of conduit 32 enables the repeated and simple deployment and retrieval of logging tool 12. Placing reel 38 on vehicle 40 or otherwise making the reel portable enables the logging system 10 to be used in multiple wellbores.

By use of an all-optical system (fiber optic transmission line 14 and sensors 17) in some embodiments, the detriments of electrical devices are avoided. This is particularly helpful in high-temperature, high-pressure wells, such conditions being extremely harsh on electrically powered devices. Compared to electrical tools, additional benefits of an all optical system include that optical tools are much less susceptible to shock or vibrations encountered during transportation to or deployment within a wellbore, optical tools are lighter, and optical tools may cost less. In other embodiments, both optical and electrical components are used.

According to another embodiment, a tracer injection tool 300 (shown in FIG. 16) can be controlled by using an optical fiber 302. The end of the optical fiber 302 is coupled to a converter 304 that converts light energy to electrical or mechanical power. Optionally, a filter 304 is provided to filter out undesired optical signals, such as optical signals that are not of a particular wavelength or wavelengths. The converter 304 is coupled to a valve 306 to control operation of the valve 306. The valve 306 controls communication through a port 308 that extends through a housing 310 of the tracer injection tool 300. In the closed position shown in FIG. 16, the valve 306 prevents tracer fluid from flowing from a channel 314 through the port 308 to the outside environment. The tracer fluid is contained in a chamber 312 that is defined by the housing 310, a wall 316, and a piston 318.

Figure 16:
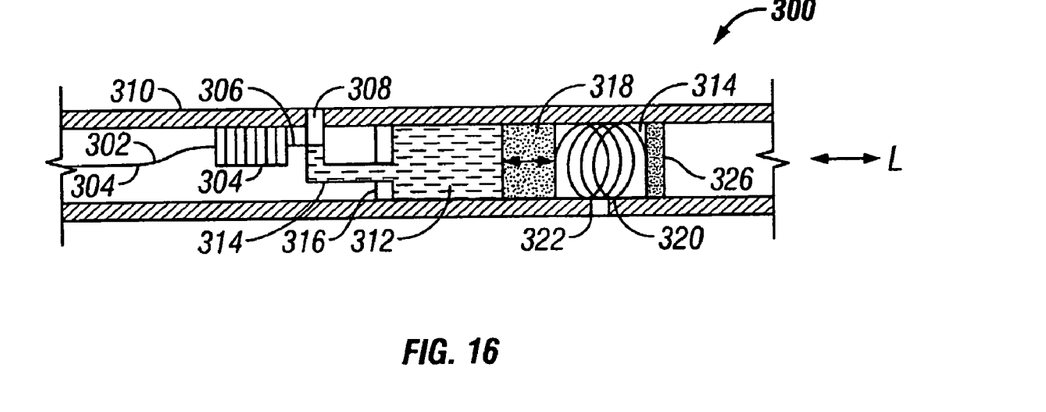
FIG. 16 is a schematic of an embodiment of a fiber optic tracer injection tool.

The piston 318 is moveable along a longitudinal direction (indicated as L) of the tracer injection tool 300. A spring 320 applies a forces against the piston 318 to apply pressure against the tracer fluid within the chamber 312. Optionally, a port 322 is provided to enable outside wellbore pressure to be communicated into a chamber 324 in which the spring 320 is located. The outside wellbore pressure applies a hydrostatic pressure against the piston 318. The spring 320 is positioned between the piston 318 and a fixed wall 326.

In operation, in response to an optical signal transmitted down the optical fiber 302, the converter 304 converts the signal to cause the valve 306 to open to allow the tracer fluid in the channel 314 to flow out of the port 308 into the surrounding wellbore environment. The tracer injection tool 300 is lowered to a specific wellbore interval, at which point the valve 306 is opened to inject the tracer fluid into the wellbore fluid. This allows a well operator to track fluid flow within the wellbore.

A modified version of the tool shown in FIG. 16 can be used to collect a sample. In a sampler, instead of a spring 320 to apply a force against the moving piston 318, an atmospheric chamber can be provided in place of the spring 320, such that when the valve 306 is opened, the outside wellbore fluid will cause the piston 318 to move against the atmospheric chamber to enable wellbore fluid to enter the chamber 312. After the sample of fluid is collected, the valve 306 can be closed (in response to an optical signal transferred down the optical fiber 302 and received by the converter 304).

Alternatively, a fiber optic sampler does not include a moveable piston as in the fiber optic sampler discussed above. Instead, the sampler includes a bottle or other chamber that contains a vacuum. When a valve controlled by an optical signal communicated down the optical fiber is opened, wellbore fluid rushes into the bottle, after which the valve can be closed.

Figure 17:
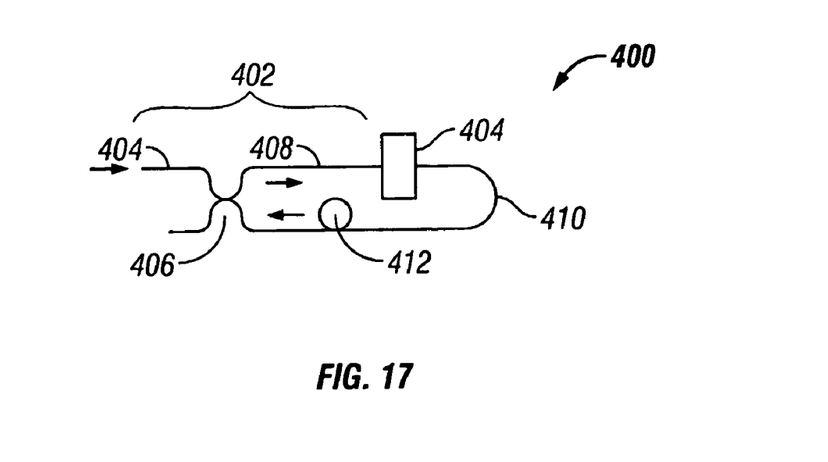
FIGS. 17-18 are schematic of embodiments of a fiber optic spectroscopy device.

According to another embodiment, a spectroscopy tool 400 includes an optical fiber 402 and a channel or chamber 404 that contains a fluid to be analyzed by use of spectroscopy. The optical fiber 402 has a first segment 404 that is coupled by a coupler 406 to a second optical fiber segment 408. The second optical fiber segment 408 is coupled to the fluid channel or chamber 404, and a third optical fiber segment 410 is coupled to the other side of the fluid channel or chamber 404. A delay element 412 is optionally provided in the third optical fiber segment 410 to provide some type of delay to light returning back to the surface.

In operation, incoming light is transmitted over the optical fiber 402 that is transferred from the optical fiber segment 404 to the second optical fiber segment 408. The incoming light passes through the fluid channel or chamber 404. Different types of fluid absorb or attenuate light at different wavelengths differently. After passing through the fluid channel or chamber 404, the attenuated or modulated light proceeds through the optical fiber segment 410, passes through the delay element 412 (if present) and is communicated through the coupler 406 back to the first optical fiber segment 404. The attenuated or modulated light is transmitted up the optical fiber 402 back to the surface.

Figure 18:
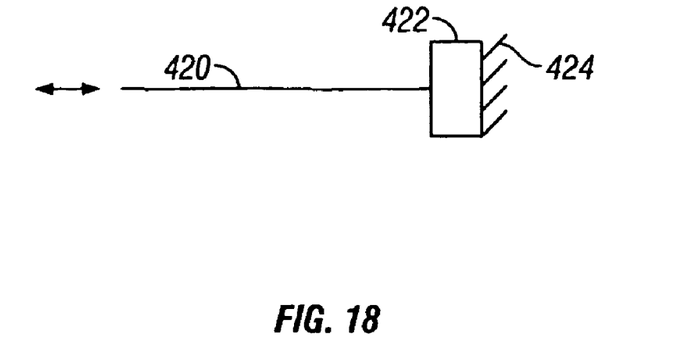

In a different embodiment of a spectroscopy tool, shown in FIG. 18, instead of using the arrangement of FIG. 17, an optical fiber 420 is attached at its end to a fluid channel or chamber 422. A mirror or other type of reflective device 424 is provided on the other side of the fluid channel or chamber 422. Light transmitted down the optical fiber 420 passes through the fluid in the channel or chamber 400, and is reflected back by mirror or other reflective device 424 back through the channel or chamber 422 and back to the optical fiber 420. The attenuated light (which has passed through the channel or chamber 422 twice) is transmitted back to the surface for processing.

In yet another embodiment, a refraction measurement tool is provided by placing an end of the optical fiber into a fluid. Light is transmitted through the optical fiber into the fluid. The amount of light reflected by the fluid is proportional to the index of refraction of the fluid in relation to the optical fiber or to an optical window in front of the optical fiber. The measured index of refraction provides an indication of the type of fluid (e.g. gas or liquid).

Figure 19:
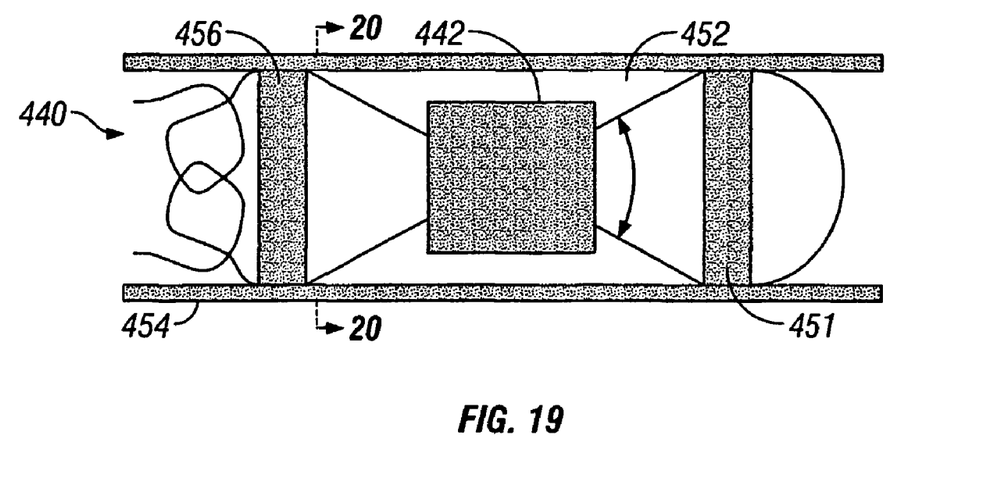
FIGS. 19-20 are schematics of a fiber optic inclinometer.
Figure 20:
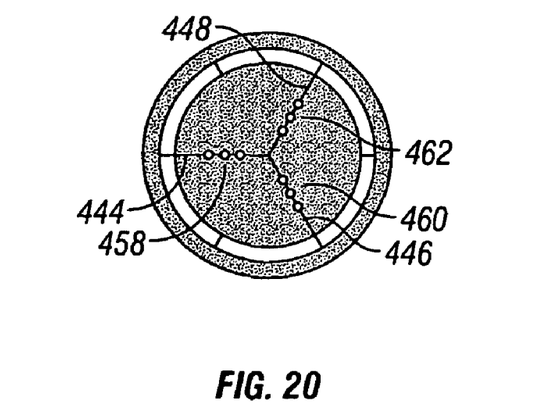

According to yet another embodiment, FIG. 19 shows an inclinometer 440 to detect the inclination of a tool string in which the inclinometer 440 is attached. The inclinometer 440 includes a mass 442 that is attached to optical fiber segments 444, 446, and 448 (FIG. 20). The other side of the mass 442 is also connected to optical fiber segments in similar fashion. The optical fiber segments 444, 446, and 448 may be part of the same optical fiber, or part of different optical fibers. To enable the optical fiber segments to be attached to the mass 442 in the manner depicted in FIGS. 19 and 20, a single optical fiber is threaded through the mass 442 and an opening in a wall 451. The optical fiber is looped (at 450) back and threaded through the wall 451 and through the mass 442 at a different location. The threading is repeated to provide the multiple fiber optic segments depicted in FIGS. 19 and 20. The mass 442 and attached optical fiber segments are located in a chamber 452 defined by the housing 454 and walls 456 and 452.

FBGs 458, 460, and 462 are provided on each of respective fiber optic segments 444, 446, and 448. Different orientations of the mass 442 cause different strains to be applied on the optical fiber segments, 444, 446, and 448, which in turn cause the FBGs 458, 460, and 462 to modulate the optical signals passing through respective signals differently.

In yet another embodiment, it is possible to optically identify the position of the main axis of a tool in relational to the magnetic force. This can be performed by using magnetostrictive materials, optically interrogating a compass or magnetically interrogating a compass and encoding the signal to a fiber in a manner similar to the casing caller locators described above.

Figure 21:
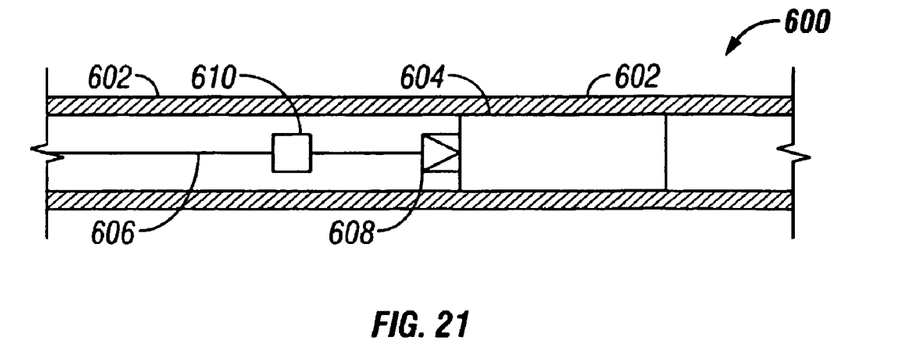
FIG. 21 is a schematic of a fiber optic gamma ray tool.

FIG. 21 shows a gamma ray detector 600 that includes a housing 602 containing a scintillating crystal 604 and an optical fiber segment 606. The scintillating crystal 604 converts gamma ray photons into optical photons. However, the photons produced by the scintillating crystal 604 are shorter wavelength signals than the infrared band of signals that are transmitted through optical fibers. In accordance with some embodiments of the invention, the optical photons produced by the scintillating crystal 604 are converted by a detector 608 to either en electrical signal or to an optical signal. If converted to an optical signal, the optical signal is suitable for transmission over the optical fiber 606 back to the surface. However, if the detector 606 converts the optical photons from the scintillating crystal 604 to an electrical signal, the electrical signal is provided to an optical transmitter or modulator 610. If a modulator, the transmitted optical signal communicated from the surface down the optical fiber 606 to the modulator 610 is changed or modulated in some manner and reflected back to the surface. However, if an optical transmitter is used, then the electrical signal provided by the detector 608 is used to control the optical signal generated by the optical transmitter and transmitted back to the surface over the optical fiber 606.

Figure 22:
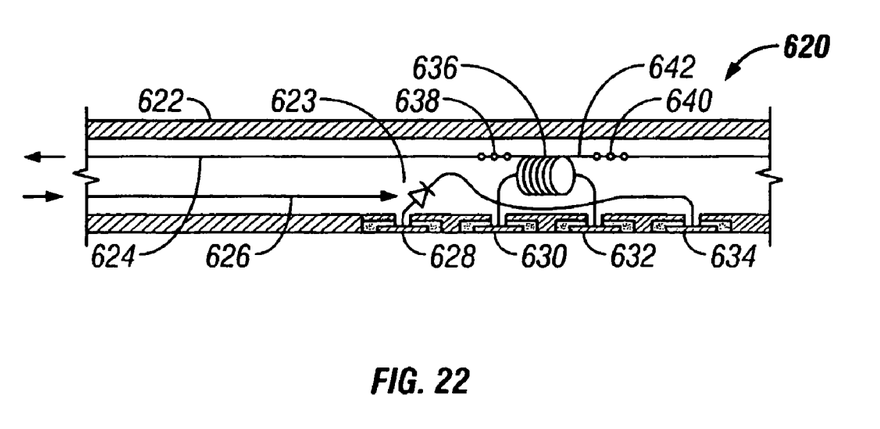
FIG. 22 is a schematic of a fiber optic resistivity measurement tool.
Figure 23:
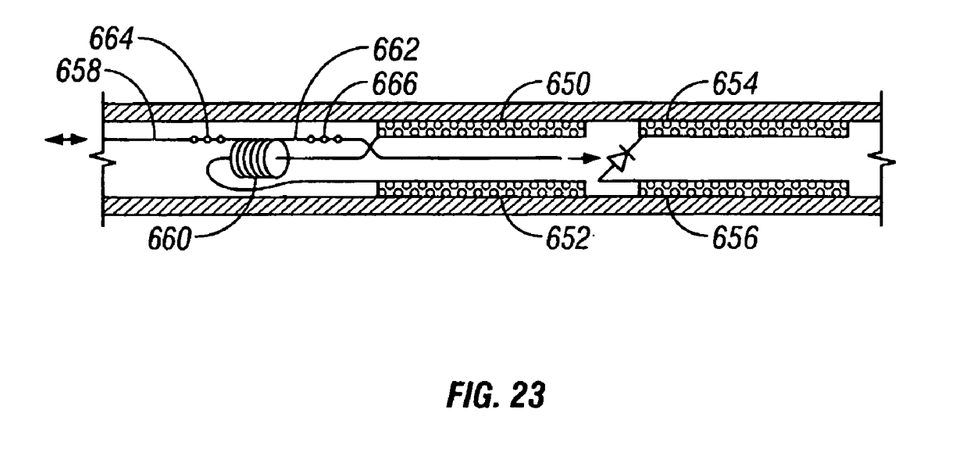
FIG. 23 is a schematic of a fiber optic induction tool.

According to further embodiments, a resistivity measurement tool 620 includes a housing 622 that contains optical fibers 624 and 626, as well as electrodes 628, 630, 632, and 634 for measuring the resistivity of the surrounding formation. The optical fiber 626 receives transmitted light from a surface, with the transmitted light received by a detector 628 that converts the optical signal to electrical signal. The electrical signal is provided to electrodes 628 and 634, which generate a current into the surrounding formation. The current is received by electrodes 630 and 632, with the current having a characteristic determined by the resistivity of the surrounding formation. The current received by the electrode 630 and 632 is converted to electrical voltage that drives a piezoelectric (PZT) element 636. The piezoelectric element 636 is provided adjacent an optical interferometer 642 that is located between two FBGs 638 and 640. The optical interferometer 642 causes a change in the path length of the optical signal in the optical fiber 624. This modulating enables surface equipment to detect the resistivity of a formation that is being tested. In addition to measuring formation resistivity, the tool 620 can also be used to determine water volume fraction estimation in multi-phase flows, corrosion surveillance, and others.

In another implementation as shown in FIG. 22, instead of using electrodes to measure resistivity or other characteristics, induction coils 650, 652, 654, and 656 are employed. In this embodiment, an optical fiber 658 transmits light down to the end of the optical fiber, which is received by a detector 655. The detector 655 converts the optical signals to electrically signals, which cause the induction coils to generate magnetic fields. The generated magnetic fields have characteristics that depend on the resistivity of the surrounding formation. The magnetic fields are detected by induction coils 650 and 652, which are coupled to a piezoelectric element 660. The piezoelectric element 660 modulates an optical interferometer 662 provided between FBGs 664 and 666. This modulation is thus controlled by magnetic fields that depend upon resistivity of the surrounding formation.

In other embodiments, optical fiber technology can be used in other applications. For example, an array of FBG sensors can be added to an optical fiber to provide multi-point temperature, strain, pressure, acoustic pressure, and a variety of other measurements. Alternatively, optical fiber gyroscopes can be used to aid the navigation into complexed wells. Also, several kinds of optical hydrophones and accelerometers can be used.

In yet another application, a combination of hydrophones or accelerometers with piezoelectric transducers powered by light to generate an acoustic signal, such as a "ping," can be used. This enables the implementation of a sonic tool to measure sound velocities, as an example.

Figure 24:
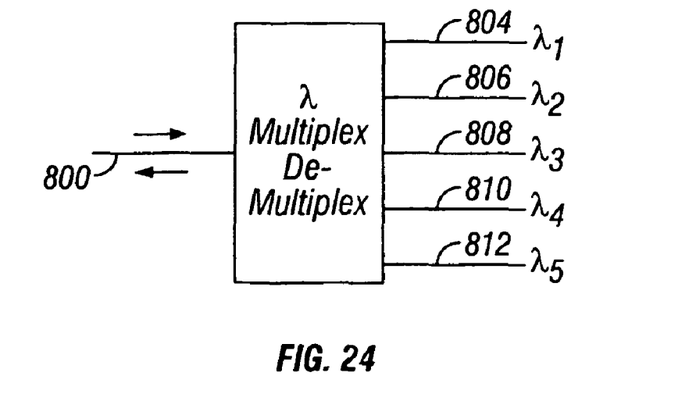
FIG. 24 is a schematic of a wavelength division multiplex (WDM) arrangement of a fiber optic system.

To enhance flexibility, an array of sensors or other devices can be coupled to an optical fiber, with filters provided to enable each sensor or device to operate at a different wavelength. For example, as shown in FIG. 24, an optical fiber 800 is coupled to a multiplexer/demultiplexer 802. The multiplexer 802 effectively contains filters to route an optical signal having a first wavelength ($\lambda_1$) over a first optical fiber segment 804, an optical signal having a second wavelength ($\lambda_2$) over a second optical fiber segment 806, an optical signal of a third wavelength ($\lambda_3$) over a third optical fiber segment 808, an optical signal having a fourth wavelength ($\lambda_4$) over a fourth optical fiber segment 810, and a fifth optical signal having a fifth wavelength ($\lambda_5$) over a fifth optical fiber segment 812. Different sensors or devices can be connected to the different optical fiber segments 804, 806, 808, 810, and 812, to enable these devices to operate at different wavelengths.

Figure 25:
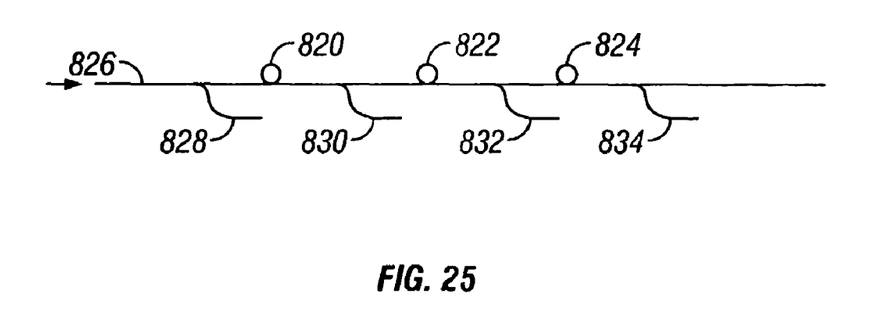
FIGS. 25-26 are schematics of embodiments of time division multiplexing (TDM) arrangements of fiber optic systems.
Figure 26:
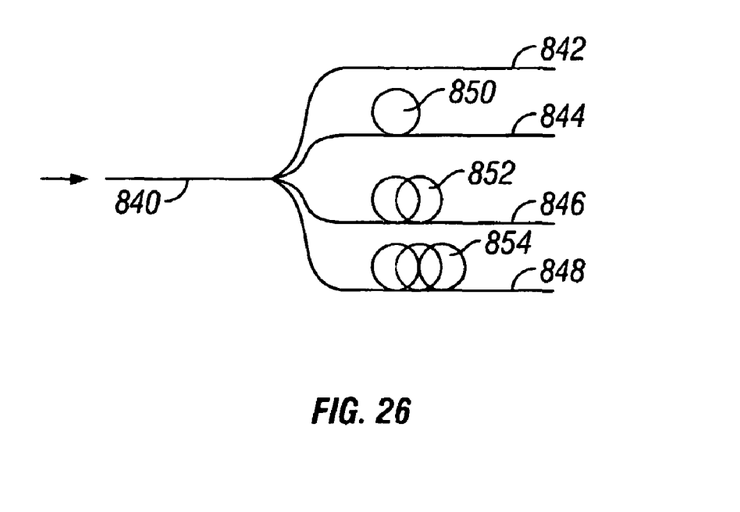

FIG. 25 shows a time division multiplexing (TDM) arrangement in which a pulse of light is used to interrogate multiple sensors or devices. TDM relies upon sending optical signals to different sensors and devices at different times. As shown in FIG. 26, this is accomplished by providing delay elements 820, 822, and 824 along a length of optical fiber 826. Splitters 828, 830, 832, and 834 are coupled to respective devices or sensors to route an optical signal to such devices or sensors. Thus, an optical signal that is transmitted from the well surface is provided to the sensor or device coupled to the first splitter 828. This signal is delayed by the delay element 820, with the first delayed optical signal passed by the coupler 830 to its respective sensor or device. This is repeated for the remaining delay elements and couplers.

FIG. 26 shows a different TDM arrangement, in which optical signal received and fiber optic segment 840 is coupled to four segments 842, 844, 846, and 848. The first optical fiber segment 842 does not have a delay element. The second optical fiber segment has one delay element 850. The third optical fiber segment 846 includes two delay elements 852. The third optical fiber segment 848 includes three delay elements 854.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A fiber optic flow sensor adapted to be disposed in a wellbore, comprising:
 a fiber optic line carrying an optical signal;
 a spinner adapted to spin when in contact with fluids flowing through the wellbore; and
 a modulator functionally connected to the spinner, the modulator modulating the optical signal depending on the spinning of the spinner,
 wherein the modulator is located on the spinner and the spinner and modulator are constructed so that the modulator becomes aligned with the fiber optic line once every revolution of the spinner.

2. The system of claim 1, wherein a pulse is reflected through the fiber optic line each time the modulator becomes aligned with the fiber optic line; and an acquisition unit receives the reflected pulse and determines the velocity of the fluids flowing through the wellbore based on the frequency of reception of the reflected pulses.

3. The sensor of claim 1, wherein the spinner includes a blade coupled to a disc.

4. The sensor of claim 3, wherein the blade is located external to a housing of the spinner, and the disc is located internal to the housing.

5. The sensor of claim 4, wherein the housing is sealed.

6. The sensor of claim 4, wherein the blade and the disc are magnetically coupled across the housing.

7. The sensor of claim 3, wherein the modulator is located on the disc.

8. The sensor of claim 7, wherein the modulator is located at a side of the disc.

9. A fiber optic flow sensor adapted to be disposed in a wellbore, comprising:
 a fiber optic line carrying an optical signal;
 a spinner adapted to spin when in contact with fluids flowing through the wellbore; and
 a modulator functionally connected to the spinner, the modulator modulating the optical signal depending on the spinning of the spinner,
 wherein the optical signal is modulated by imparting a strain on the fiber optic line,
 wherein the modulator comprises a fiber-bragg grating incorporated on the fiber optic line.

10. The sensor of claim 9, further comprising:
 a permanent magnet coupled to the spinner;
 a coil attached to a housing; and
 wherein the permanent magnet and the coil become magnetically connected as the spinner revolves.

11. The sensor of claim 10, wherein the magnetic connection generates a voltage that causes a piezoelectric material mechanically coupled to the fiber optic line to constrict and strain the fiber optic line.

12. A method to calculate the flow of fluids within a wellbore, comprising:
 providing a spinner adapted to spin when in contact with fluids flowing through the wellbore; and
 modulating an optical signal transmitted through a fiber optic line depending on the spinning of the spinner wherein said modulating step comprises aligning a modulator with the fiber optic line once every revolution of the spinner.

13. The method of claim 12, further comprising determining the velocity of the fluids flowing through the wellbore based on the frequency of modulations.

14. A method to calculate the flow of fluids within a wellbore, comprising:
 providing a spinner adapted to spin when in contact with fluids flowing through the wellbore; and
 modulating an optical signal transmitted through a fiber optic line depending on the spinning of the spinner wherein said modulating step comprises imparting a strain on the fiber optic line.

15. The method of claim 14, wherein the imparting step comprises:
 creating a magnetic connection related to the revolution of the spinner; and
 generating a voltage that causes a piezoelectric material mechanically coupled to the fiber optic line to constrict and strain the fiber optic line.

* * * * *